United States Patent [19]

Archibald

[11] 4,290,574
[45] Sep. 22, 1981

[54] KINEMATIC RESTRAINT

[76] Inventor: John H. Archibald, P.O. Box 283, Golden, Colo. 80401

[21] Appl. No.: 155,493

[22] Filed: Jun. 2, 1980

[51] Int. Cl.³ ............................................ F16M 11/02
[52] U.S. Cl. ...................................... 248/177; 33/299
[58] Field of Search ............... 248/187, 177, 278, 185, 248/178, 183, 186, 180; 33/299

[56] References Cited

U.S. PATENT DOCUMENTS

| | | | |
|---|---|---|---|
| 3,092,911 | 6/1963 | Lotzgesell | 33/299 |
| 3,368,284 | 2/1968 | Boice | 248/180 X |
| 3,566,101 | 2/1971 | Hagner | 248/177 X |
| 3,828,443 | 8/1974 | James | 33/299 X |
| 3,931,947 | 1/1976 | Tagnon | 248/180 |

FOREIGN PATENT DOCUMENTS 518148  2/1940  United Kingdom ................. 33/299

OTHER PUBLICATIONS

Scientific Papers By Lord Rayleigh also known as John William Strutt, CH167 pp. 341–346 (Proceedings of the Royal Society, XLVII pp. 281–287, 1890), Dover Publications, Inc., New York.
The Scientific Papers of James Clerk Maxwell, Edited by W. D. Niven, vol. III, pp. 506–508, Dover Publications, Inc., New York.
Procedures in Experimental Physics by John Strong, Chap. XIV, p. 586, Prentice—Hall, Inc.

Primary Examiner—J. Franklin Foss
Attorney, Agent, or Firm—Fitch, Even, Tabin, Flannery & Welsh

[57] ABSTRACT

Apparatus is provided for repeatedly connecting a precision instrument to a support frame in an identical position relating to the support frame. The apparatus particularly relates to an improved kinematic restraint for removable equipment.

8 Claims, 5 Drawing Figures

KINEMATIC RESTRAINT

The present invention relates generally to the field of measuring equipment and more particularly to an improved kinematic restraint for removable equipment.

In the field of sensitive measuring equipment, there are a number of instruments which are moved frequently enough so that permanent supporting apparatus are not suitable. Therefore, these instruments and their respective supporting apparatus are constructed in a manner such that they are portable. Primary examples of such portable equipment are the static telescopes used by surveyors. In the field, a surveyor makes measurements from several different locations, requiring repeated moves from one site to another. As it is rather awkward to move the entire apparatus including the tripod support frame and telescope, they are separably connected for separate transportation.

In many types of analytical equipment very small changes in the position of the instrument can make a substantial difference in the accuracy of the resulting measurements. In surveying, for example, an error of just 5 seconds in the positioning of a static telescope causes an error of about $\frac{1}{8}$ inch at 400 ft. In an effort to overcome such errors in positioning analytical measuring equipment, kinematic restraints have been employed.

According to well-known principles an object intended to rest in a fixed position, despite repeated removal and replacement, must have exactly six bearing points. These requirements are discussed in *The Scientific Papers of James Clerk Maxwell*, edited by W. D. Niven, M.A., F.R.S., Dover Publications, Inc., New York. Various kinematic restraints have been suggested and used. For example, a well-known restraint includes a fixed base plate which has three V-shaped grooves formed therein. The grooves form angles of 120° with one another and the walls of each groove form angles of 45° with the surface of the base plate. On a second plate, three convex spherical members are secured in an equilateral triangular array. When the second plate is rested upon the first plate, each of the three convex spherical members rests within one of the three grooves, contacting the two side walls of the respective groove, thus providing the necessary six bearing points. Any instrument secured to the second plate may be lifted from the base plate and, when replaced, will occupy the identical position relative to the base, which normally remains fixed, at least relative to a support frame.

Another prior kinematic restraint includes a fixed base plate which has one V-shaped groove and a triangular impression having three mutually intersecting walls, as would be formed by pressing a corner of a cube into the plate. The second plate, upon which three convex spherical members are secured, rests upon the base plate with a first convex spherical member resting in the triangular impression, a second convex spherical member resting in the V-shaped slot and the third convex spherical member resting upon the surface of the base plate. The first spherical member provides three bearing points on the three walls of the triangular impression. The second spherical member provides two bearing points in the V-shaped groove. The sixth bearing point is provided by the contact between the third spherical member and the base plate.

While such prior kinematic restraints have provided excellent reproduction of relative position, they are quite difficult to manufacture. In particular, in the above-described restraint including three V-shaped grooves, the grooves must be very precisely arranged in 120° intervals, the grooves must be cut precisely with planar walls, a demanding machining operation. In addition, the convex spherical members must form an exact equilateral triangle. Otherwise the required six bearing points are not formed and shifting occurs. Furthermore, because all three spherical members are identical, care must be taken to ensure that the same spherical member rests in the corresponding groove each time the second plate is removed and replaced upon the first plate.

In the second restraint described above, both the triangular impression and the V-shaped groove must be cut precisely with planar walls—both of which are demanding machining operations. The problems of machining such grooves and impressions are further compounded by the fact that the materials used in kinematic restraints must be extremely hard in order to prevent wear. Otherwise, there is a gradual erosion of the contacting surfaces at the bearing points, with an attendant loss of precision. Such hardened materials are also relatively expensive and, although only six points of the whole surface must withstand wearing, the entire plates must be composed of hardened material, which is expensive.

It is therefore an object of the present invention to provide an improved kinematic restraint which is relatively simple to manufacture and does not require a particularly hard material for an entire plate. It is also an object to provide a kinematic restraint which does not require the machining of either planar grooves or triangular impressions in a plate. It is an additional object of the invention to provide an improved kinematic restraint with rigidly attached telescope which is relatively simple to manufacture and does not require a particularly hard material for and entire plate.

Further objects and advantages will become apparent when the following detailed description is considered with reference to the accompanying drawings, in which.

Figure 1:
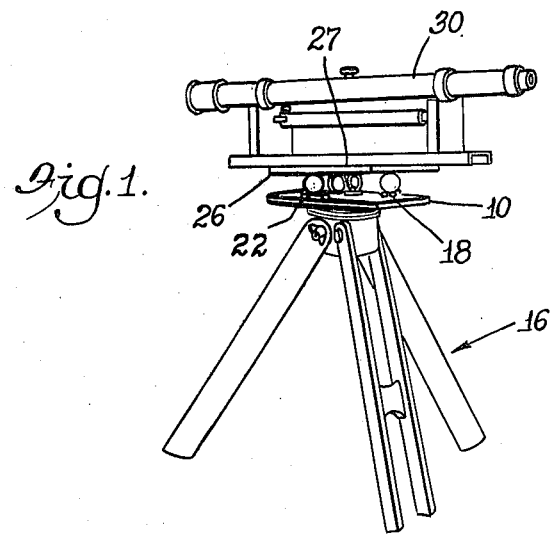
FIG. 1 is an elevational view of a kinematic restraint for a static telescope and supporting tripod, embodying various features of the present invention.
Figure 2:
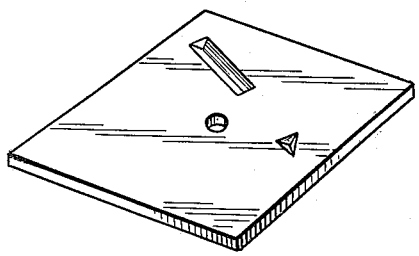
FIG. 2 is a perspective view of a base plate of a prior kinematic restraint.
Figure 3:
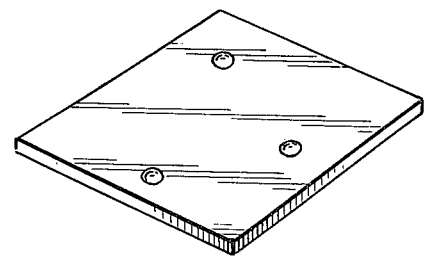
FIG. 3 is an inverted perspective view of an upper plate of a prior kinematic restraint.
Figure 4:
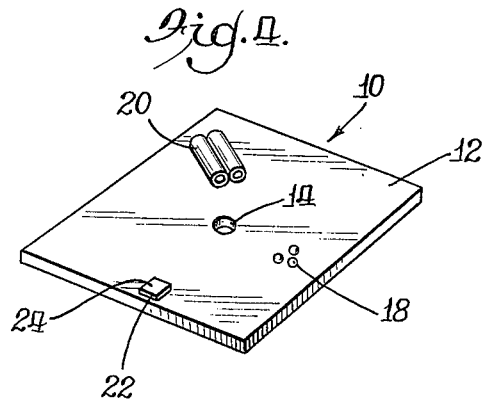
FIG. 4 is a perspective view of a base plate of a kinematic restraint embodying various of the features of the present invention.
Figure 5:
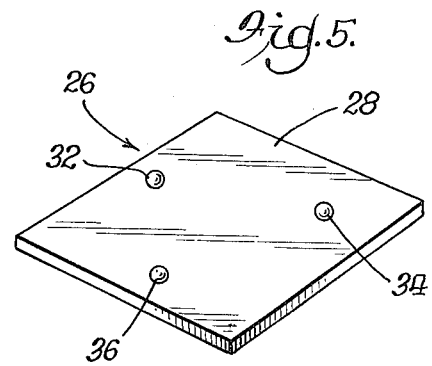
FIG. 5 is an inverted perspective view of an upper plate for six-point bearing contact with the base plate of FIG. 4.

Referring to the drawings, in accordance with the present invention, a first plate 10, comprising a rigid material such as steel, has a planar surface 12. The plate 10 is sufficiently thick to resist deformation in the normal usage of a kinematic restraint, for example about one-half inch thick. However, the hardness of the surface is not of particular concern because there is no wearing contact therewith. A hole 14 at the center of the plate 10 is adapted to receive a threaded post of a tripod 16, to which a threaded nut is threadably attached to secure the plate 10 to the tripod 16 in a horizontal position in which the planar surface 12 faces upwardly, away from the tripod.

Three identical first convex spherical members 18 are secured to the surface 12 in an equilateral triangular array. The triangle defined by the members 18 comprises only a small portion of the area of the surface 12. The members 18 comprise a hard material adapted to resist deformation and erosion, such as the steels used in the manufacture of standard ball bearings. The members 18 are secured to the plate 10, as by welding.

Spaced apart from the triangle defined by the three members 18 are a pair of identical cylindrical members 20 which are secured to the surface 12, as by welding, in a codirectional and touching arrangement. The members 20 touch one another along a line of contact which is parallel to both the axes of the members 20 and the surface 12. The members 20 comprise a hard material adapted to resist erosion and deformation, such as the hardened steels used in the manufacture of wrist pins.

A rectangular boss 22, having a smooth, hardened exposed surface 24 generally parallel to the surface 12, is secured to the surface 12, as by welding, in a location such that an approximately equilateral triangle is defined wherein the boss 22 defines one vertex or corner, the center of the triangle formed by the three members 18 defines a second vertex or corner, and the third vertex is defined by the midpoint of the line of contact of the cylindrical members 20.

A second plate 26, comprising a rigid material such as steel, has a planar surface 28. The plate 26 is sufficiently thick to resist deformation in the normal usage of a kinematic restraint, for example about one-half inch thick. The hardness of the surface is not of particular concern because there is no wearing contact therewith. On the second plate surface 27, opposite from the surface 28, suitable means such as bolts are provided for securing a telescope 30 laser, or other device thereto.

A first convex spherical member 32, comprising a hard material such as one of the steels used for ball bearings, is secured to the surface 28, as by welding. The member 32 is of a size adapted to simultaneously contact the three members 18 and be spaced from the surface 12. For example, if the members 18 are in contacting relationship with one another, the member 32 is preferably of a size equivalent to the size of a member 18. Thus, when the member 32 is seated upon the three members 18, a trihedral pyramid structure is formed and three of the necessary six contact points are formed between the member 32 and the three members 18. On the basis of these three contact points between the member 32 and the three members 18, the second plate 26 is limited to pivotal motion about axes of the member 32. One pivotal axis is perpendicular to the first plate 10 and the others are parallel to the first plate 10.

A second convex spherical member 34, comprising a hard material such as one of the steels used for ball bearings, is secured to the surface 28, as by welding. The member 34 is spaced from the member 32 by a distance substantially equal to the distance between the center of the triangle defined by the first members 18 and the midpoint of the line of contact of the cylindrical members 20. Thus, when the member 32 is seated upon the members 18, the member 34 rests upon the cylindrical members 20, above the line of contact, to provide two more of the necessary contact points. These two contact points prohibit pivotal motion of the plate 26 about the axis perpendicular to the plate 10. Thus, with five contact points, the second plate remains pivotable about an axis passing through the members 32 and 34.

A third convex spherical member 36 comprising a hard material such as one of the steels used for ball bearings is secured to the surface 28 as by welding. The member 36 is spaced from the member 32 by a distance substantially equal to the distance between the center of the triangle defined by the members 18 and the center of the boss surface 24. The member 36 is also spaced from the center of the member 34 by a distance substantially equal to the distance between the center of the boss surface 24 and midpoint of the line of contact of the cylindrical members 20. Thus, when the member 32 is seated upon the members 18 and the member 34 is seated upon the cylindrical members 20, the member 36 rests upon the boss surface 24 to prevent pivotal motion of the plate 26 about the axis passing through the members 32 and 34.

In constructing a restraint in accordance with the present invention, there is no requirement for difficult machining operations such as are involved in machining planar grooves or impressions into a rigid material such as steel. Moreover, the entire plate need not be especially hard material to resist wearing as there are no direct contact points which involve the plates themselves.

While a preferred embodiment of the apparatus of the present invention has been illustrated and described hereinabove, it will be understood that changes and modifications may be made therein without departing from the invention in its broader aspects.

Various features of the invention are defined in the following claims.

What is claimed is:

1. In a restraint apparatus for repeatedly connecting a precision instrument to a support frame in an identical position relative to said support frame, comprising a first plate secured to said support frame and having a generally horizontal planar surface, and a second plate secured to said instrument and having a generally horizontal planar surface, said horizontal planar surfaces of said first plate and said second plate facing one another, and carrying means for providing six contact points, the improvement wherein three of said contact points are provided by contact means comprising three first convex spherical members secured to said facing planar surface of said first plate in triangular array, and a second convex spherical member secured to the facing planar surface of said second plate, said second convex spherical member being seated upon and simultaneously contacting each of said three first convex spherical members at a point and being spaced from said facing planar surface of said first plate.

2. An apparatus as defined in claim 1 wherein said three first convex spherical members are identical in size.

3. An apparatus as defined in claim 1 wherein said three first convex spherical members are secured to said facing planar surface in an equilateral triangular array.

4. In a restraint apparatus for repeatedly connecting a precision instrument to a support frame in an identical position relative to said support frame, comprising a first plate secured to said support frame and having a generally horizontal planar surface, and a second plate secured to said instrument and having a generally horizontal planar surface, said horizontal planar surface of said first plate and said second plate being in facing relation to one another and carrying means for providing six points of contact, the improvement wherein two of said contact points are provided by contact means comprising two cylindrical members secured to said facing planar surface of said first plate in parallel relation to one another to define a channel parallel to said facing planar surface of said first plate and a third convex spherical member secured to the facing planar surface of said second plate, said third convex spherical member contacting each of said cylindrical members at a point along said channel and being spaced from said facing planar surface of said first plate.

5. An apparatus as defined in claim 4 wherein said two cylindrical members are identical in dimensions.

6. An apparatus as described in claim 4 wherein said cylindrical members are in contact with one another along their lengths.

7. In a restraint apparatus for repeatedly connecting a precision instrument to a support frame in an identical position relative to said support frame, comprising a first plate secured to said support frame and having a generally horizontal planar surface, and a second plate secured to said instrument and having a generally horizontal planar surface, said horizontal planar surfaces of said first plate and said second plate facing one another and carrying means for providing six contact points, the improvement wherein three of said contact points are provided by contact means comprising three first convex spherical members secured to said facing surface of said first plate in a triangular array and a second convex spherical member secured to said facing planar surface of said second plate, said second convex spherical member being seated upon and simultaneously contacting each of said three first convex spherical members at a point and being spaced from said facing planar surface of said first plate, and two of said contact points are provided by contact means comprising two cylindrical members secured to said facing planar surface of said first plate in parallel relation to one another to define a channel parallel to said facing planar surface of said first plate and a third convex spherical member secured to the facing planar surface of said second plate, said third convex spherical member contacting each of said cylindrical members at a point along said channel and being spaced from said facing planar surface of said first plate.

8. An apparatus as described in claim 7 wherein one of said contact points is provided by contact means comprising a boss secured to said facing planar surface of said first plate and a convex spherical member secured to the facing planar surface of said second plate, said convex spherical member resting upon said boss.

* * * * *